D. B. WESSON.
SAFETY LOCK MECHANISM FOR FIRE ARMS.
No. 11,192. Reissued Sept. 15, 1891.
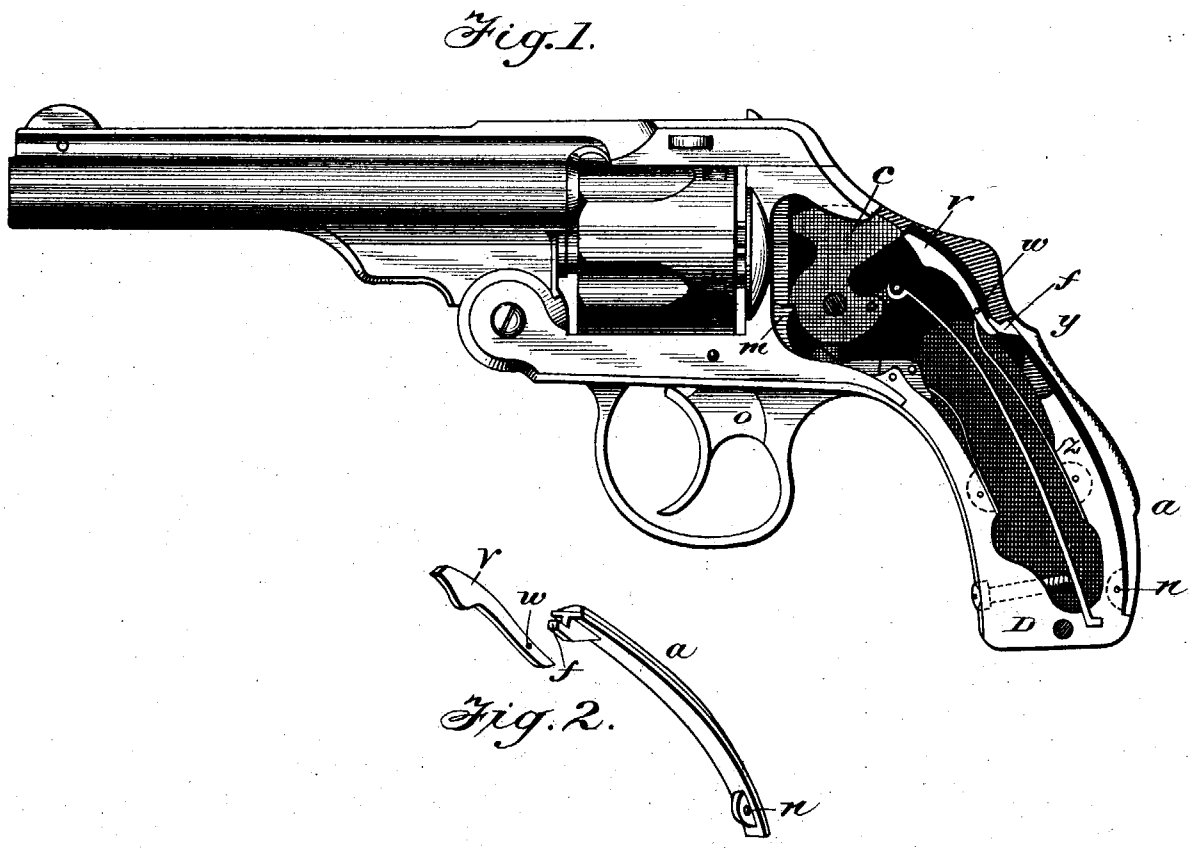
Witnesses:
J. W. Garfield
T. F. Dimon
Inventor:
Daniel B. Wesson,
per Schapurd & Co.
Attys.
THE NORRIS PETERS CO., PHOTO-LITHO., WASHINGTON, D. C.

UNITED STATES PATENT OFFICE.

DANIEL B. WESSON, OF SPRINGFIELD, MASSACHUSETTS.

SAFETY-LOCK MECHANISM FOR FIRE-ARMS.

SPECIFICATION forming part of Reissued Letters Patent No. 11,192, dated September 15, 1891.

Original No. 323,838, dated August 4, 1885. Application for reissue filed May 20, 1891. Serial No. 393,507.

*To all whom it may concern:*

Be it known that I, DANIEL B. WESSON, a citizen of the United States, residing at Springfield, in the county of Hampden and State of Massachusetts, have invented new and useful Improvements in Revolving Fire-Arms, of which the following is a specification.

This invention relates to improvements in revolving fire-arms, and pertains to the lock mechanism thereof, the object being to provide in fire-arms improved devices for preventing the hammer from being inadvertently operated to discharge the arm.

In the drawings forming part of this specification, Figure 1 is a side elevation, partly in section, of a fire-arm embodying my invention. Fig. 2 is a perspective view of detail parts.

In the drawings, D indicates the handle of the arm, the hammer *c* being hung in the frame in the usual position and manner and connected with the ordinary mainspring. On the rear or hand-bearing side of the handle D is pivoted at *n* a lever *a*, which extends outside of the handle to about the point *y*, where there is an opening through the latter through which the offset projection *f* on the free end of lever *a* extends, reaching toward the hammer.

Within the handle D, at the rear of the hammer, is pivoted at *w* to the side of the frame the lever *v*, its short arm extending under the projection *f* on the end of lever *a* and its long arm extending to the rear edge of hammer *c*, as shown. The inside of the frame or handle over lever *v* is cut away to permit the long arm of the latter to swing upward. A spring *z* bears on the under side of the short arm of lever *v*, pressing it against the projection *f* on lever *a*, carrying said projection and the end of the latter against the edge of the opening in the handle, and throwing the end of the long arm of lever *v* behind the hammer *c*, as in Fig. 1.

The sear *m* is pivotally attached to the trigger *o* in the ordinary manner, and engages with the hammer, as shown.

The operation of the above-described improvements is as follows: It is obvious that while the end of lever *v* is in a position behind the upper end of hammer *c*, as shown in Fig. 1, the hammer cannot, by pulling trigger *o*, be operated to cock it and discharge the arm. The lever *a*, through which lever *v* is operated, being located outside of the handle, constitutes substantially the bearing-surface for the hand when grasping the arm of the rear side of the handle; and when the finger is engaged with the trigger to pull the latter and cock the hammer against the force of the mainspring the hand is naturally drawn against lever *a*, thereby forcing its free end against the short arm of lever *v* and swinging the end of the long arm of the latter upward and clear from the rear of the hammer, thus removing all obstacles to the free backward action of the hammer and its proper action to discharge the arm. Immediately that lever *a* is free from the grasp of the hand, as aforesaid, the two levers reassume the positions shown in Fig. 1. Thus if, with no intent to fire the arm, an attempt is made to pull the trigger without depressing lever *a*, the trigger and hammer cannot be operated, and hence the inadvertent discharge of the arm is prevented.

What I claim as my invention is—

The combination, with the hammer of a fire-arm, of a two-armed lever pivoted in the handle behind the hammer, a lever pivoted by one end on the rear outside of the handle of the arm, and there constituting substantially the bearing-surface thereof, having its free end penetrating the handle and engaging with said two-armed lever, and a spring bearing upon the latter, substantially as set forth.

DANIEL B. WESSON.

Witnesses:

WM. S. BELLOWS,

A. D. PORTER.